(12) United States Patent
Padmanabhan

(10) Patent No.: US 10,239,233 B2
(45) Date of Patent: Mar. 26, 2019

(54) ELEMENT FOR A CO-ROTATING TWIN SCREW PROCESSOR

(71) Applicant: STEER ENGINEERING PRIVATE LIMITED, Bangalore (IN)

(72) Inventor: Babu Padmanabhan, Bangalore (IN)

(73) Assignee: STEER ENGINEERING PRIVATE LIMITED, Bangalore (IN)

(*) Notice: Subject to any disclaimer, the term of this patent is extended or adjusted under 35 U.S.C. 154(b) by 439 days.

(21) Appl. No.: 15/077,810

(22) Filed: Mar. 22, 2016

(65) Prior Publication Data

US 2016/0279828 A1    Sep. 29, 2016

(30) Foreign Application Priority Data

Mar. 23, 2015 (IN) .......................... 1471/CHE/2015

(51) Int. Cl.
| | |
|---|---|
| *B29B 7/00* | (2006.01) |
| *B29C 47/00* | (2006.01) |
| *B29B 7/48* | (2006.01) |
| *B29C 47/08* | (2006.01) |
| *B29C 47/40* | (2006.01) |
| *B29C 47/60* | (2006.01) |

(52) U.S. Cl.
CPC ............... *B29B 7/489* (2013.01); *B29B 7/48* (2013.01); *B29B 7/484* (2013.01); *B29C 47/0844* (2013.01); *B29C 47/0861* (2013.01); *B29C 47/402* (2013.01); *B29C 47/60* (2013.01); *B29C 47/6056* (2013.01); *B29C 47/6025* (2013.01)

(58) Field of Classification Search
CPC ............ B29C 47/0844; B29C 47/0861; B29C 47/402; B29C 47/60; B29C 47/6056; B29C 47/6025; B29B 7/489; B29B 7/48; B29B 7/484

See application file for complete search history.

(56) References Cited

U.S. PATENT DOCUMENTS

| | | | |
|---|---|---|---|
| 6,783,270 B1 | 8/2004 | Padmanabhan | |
| 8,753,003 B2* | 6/2014 | Kirchhoff | ........... B29C 47/6075 366/83 |
| 2011/0075511 A1* | 3/2011 | Bierdel | ............... B29C 47/0854 366/301 |
| 2014/0036614 A1 | 2/2014 | Padmanabhan | |

FOREIGN PATENT DOCUMENTS

WO    WO 2011/073121    6/2011

* cited by examiner

*Primary Examiner* — Anshu Bhatia
(74) *Attorney, Agent, or Firm* — Klarquist Sparkman, LLP

(57) ABSTRACT

An element for a co-rotating twin screw processor, the element having a lead 'L' and at least one continuous flight helically formed thereon and, wherein the flight transforms at least once from a first non-integer lobe flight into a second non-integer lobe flight in a fraction of the lead 'L' and transforms back to the first non-integer lobe flight in a fraction of the lead 'L'.

20 Claims, 5 Drawing Sheets

ELEMENT FOR A CO-ROTATING TWIN SCREW PROCESSOR

FIELD

The disclosure relates to the field of twin screw processors. More particularly, the disclosure relates to an element for a twin screw processor.

BACKGROUND

Kneading in a twin screw processor, such as an extruder, involves application of forces that cause shearing, smearing, elongation, bending, torsion and compression. Progress of a material through the twin screw processor is generally highly controlled and such a system can be used to conduct sophisticated chemical reactions. For e.g., thermoplastic compounding requires standard conveying, mixing or kneading elements. The kneading elements mix compounds primarily through folding mechanism. This melting and folding mechanism results in fatigue in the elements which often causes breakage of the elements or the shaft.

U.S. Pat. No. 6,783,270 to Babu Padmanabhan, discloses fractional lobe elements. U.S. Publication number 2014/0036614 A1 to Babu Padmanabhan provides for extruder elements for co-rotating extruders that eliminate or reduce the peak shear experienced by material, increase distributive mixing for more homogeneous mixing and better melt temperature control and also maintain the self-wiping ability of the extruder. These elements comprise of a continuous flight where the flight transforms from an integer lobe flight into a non-integer lobe flight and transforms back to an integer lobe flight in a fraction of the lead 'L' or vice versa. Integer lobes or fractional lobes can be used to generate conveying screws (by continuous helical transformation) or kneading blocks (by interrupted linear and rotary transformations). Elements that are integer lobed or fractional lobed when designed as kneading blocks present a perpendicular face to the flow causing melt stagnation and large pressure and shear peaks during melting. Thus, these kneading block elements are not ideal for melting zone in an extruder as these elements are not capable of providing the required superior process capability in melting zone. Such elements also suffer from fatigue that may result in breakage.

SUMMARY

An element for a co-rotating twin screw processor is disclosed. The element has a lead 'L' and at least one continuous flight helically formed thereon and, wherein the flight transforms at least once from a first non-integer lobe flight into a second non-integer lobe flight in a fraction of the lead 'L' and transforms back to the first non-integer lobe flight in a fraction of the lead 'L'.

In another aspect, an element for a co-rotating twin screw processor, the element having a lead 'L' and at least one continuous flight helically formed thereon and, wherein the flight transforms at least once from a first non-integer lobe flight into a second non-integer lobe flight in a fraction of the lead 'L' and transforms from the second non-integer lobe flight to a third non-integer lobe flight in a fraction of the lead 'L', is disclosed.

In another aspect, a twin screw processor is disclosed. The twin screw processor comprising a housing having at least two cylindrical housing bores, each housing bore having an axis disposed parallel to the other axis; at least a first screw shaft and a second screw shaft being disposed in the first and second housing bores; the first and second screw shaft being provided with elements defining a mixing zone; wherein at least one element has a lead 'L' and at least one continuous flight helically formed thereon and the flight transforms at least once from a first non-integer lobe flight into a second non-integer lobe flight in a fraction of the lead 'L' and transforms back to the first non-integer lobe flight in a fraction of the lead 'L'.

DETAILED DESCRIPTION

Figure 3:
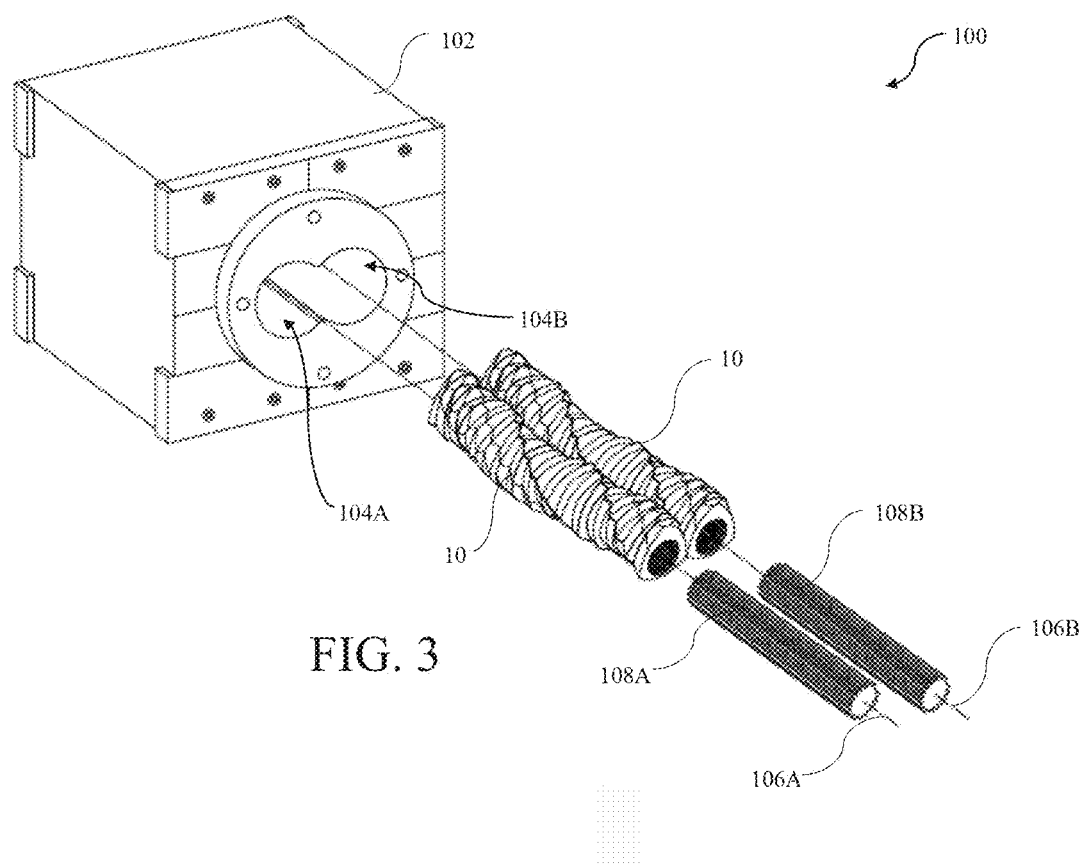
FIG. 3 illustrates a co-rotating twin screw processor in accordance with an embodiment of the present disclosure.

FIG. 3 illustrates a co-rotating twin screw processor (100) comprising a housing (102) having two cylindrical housing bores (104A, 104B), each housing bore (104A, 104B) having an axis (108A and 108B respectively) disposed parallel to the other axis. A first screw shaft (106A) and a second screw shaft (106B) are disposed in the first and second housing bores (104A, 104B) respectively. Processing elements (10) or 'elements' are mounted on the first and second screw shafts (106A, 106B) and define a mixing zone within the processor (100). The elements (10) may comprise of a grooved axial bore in which splines of the screw shaft are engaged or other means for mounting on the screw shaft.

An element has one or more lobes that form a flight on the element. The number of lobes has conventionally been an integer and typically varies between one to three lobes. Such elements are referred to as "integer lobe element" in this disclosure. The number of lobes may also be a non-integer and such elements are referred to as "non-integer lobe element" or elements having a non-integer lobe flight.

A non-integer lobe element may be a fractional lobed element. A fractional lobed element is an element intermediate a first integer element (n) and a second integer element (N) by a predefined fraction, such that N/n is an integer and the fraction determines the degree of transition between the first integer and the second integer. A single flight lobe and a bi-lobe can form fractional lobes such as 1.2.xx, where xx an be any number from 1 to 99. The numbers 1 to 99 define whether the fractional lobe will look more like a single flight element or a bi-lobed element. The numbers 1 and 2 in the notation 1.2.xx represent the lobe element intermediate a single flight element (1) and a bi-lobe element respectively (2). Examples of a fractional lobe element formed from a single lobe and a bi-lobe element are described in U.S. Pat. No. 6,783,270.

A non-integer lobe element may be an irrational number lobed element. Irrational number lobed elements are described in WO 2011/073121.

An element (10) for a co-rotating twin screw processor (100) is disclosed. The element (10) has a lead 'L' and has at least one flight (12) helically formed thereon. The flight formed is continuous without any breaks or interruptions. The flight transforms at least once from a first non-integer lobe flight into a second non-integer lobe flight in a fraction of the lead 'L' and transforms back to the first non-integer lobe flight in a fraction of the lead 'L'.

The first non-integer lobe flight may be a fractional lobe flight. The second non-integer lobe flight may be a fractional lobe flight. In other embodiments, the first non-integer lobe flight may be an irrational number lobe flight and the second non-integer lobe flight may an irrational number lobe flight. In other embodiments, both the first non-integer lobe flight and the second non-integer lobe flight may be fractional lobe flights. In other embodiments, both the first non-integer lobe flight and the second non-integer lobe flight may be irrational number lobe flights.

Figure 1A:
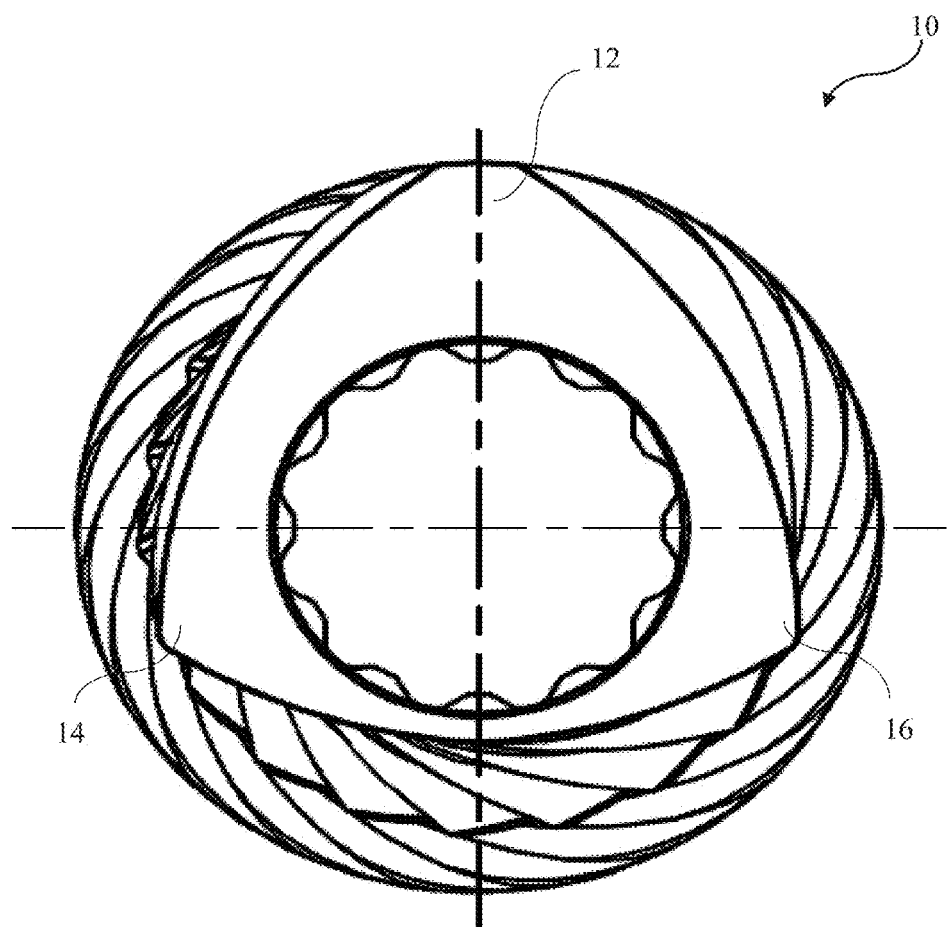
FIG. 1a illustrates a front view of the elements accordance with an embodiment of the present disclosure.
Figure 1B:
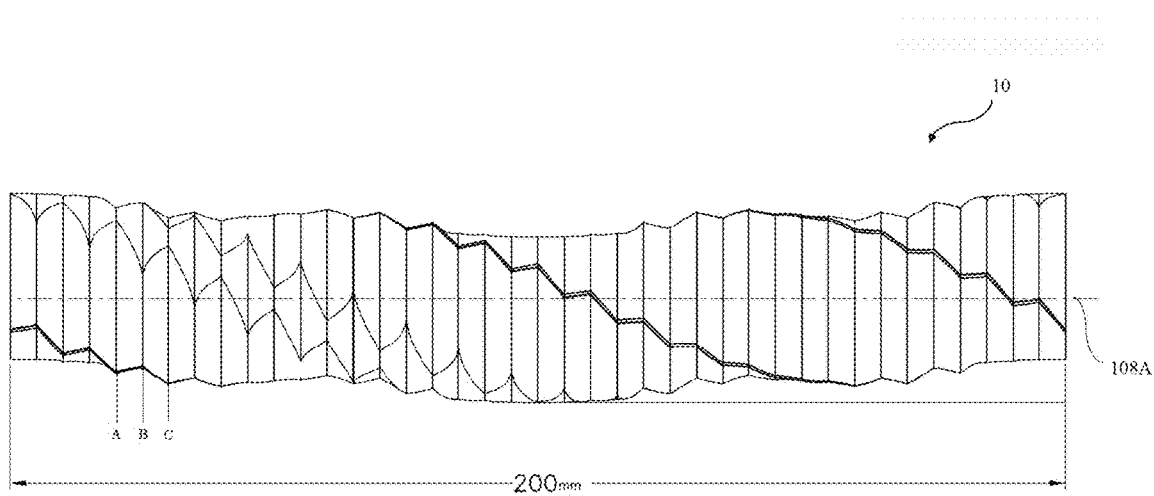
FIG. 1b illustrates a top view of the element in accordance with an embodiment of the present disclosure.

Referring to FIG. 1a, a front view of an element (10) in accordance with an embodiment of the present disclosure is illustrated. FIG. 1b shows the top view of the element (10) in FIG. 1a. The length of the element (10) may be equal to the lead 'L' of the element (10). In other embodiments, the length of the element (10) may be different than the lead 'L' of the element (10). The element (10) has a length of 200 mm and a lead 'L' also of 200 mm. At point A, the profile of the element (10) is a first fractional lobe element, i.e. 1.3.80 in the example illustrated. At point B, the profile of the element is a second fractional lobe element, i.e. 1.3.20. At point C, the profile of the element is again the first fractional lobe element, i.e. 1.3.80. The element (10) transforms from profile A to profile B to profile C. The transformation of the element (10) from profile A to profile B, takes place within a fraction of the lead 'L', 5 mm in the embodiment disclosed. The element (10) now transforms from profile B to profile C over the next 5 mm.

In the embodiment of FIG. 1b, the transformation from a first fractional lobe flight into second fractional lobe flight as well as the transformation from the second fractional lobe flight into the first fractional lobe flight takes place in 10 mm or within a fraction of the lead 'L'.

In other embodiments, the flight transforms a plurality of times from a first non-integer lobe flight into a second non-integer lobe flight in a fraction of the lead 'L' and transforms back to the first non-integer lobe flight in a fraction of the lead 'L.' By way of example, the transformation from a first fractional lobe flight into second fractional lobe flight and back to first fractional lobe flight, or vice versa, may take place a plurality of times. In the embodiment of FIG. 1b transformation from a first fractional lobe flight into second fractional lobe flight and back to first fractional lobe flight is repeated twenty times along the length of the element (10) to obtain the 200 mm element.

In accordance with an embodiment, the first non-integer lobe flights for the plurality of transformations along the lead 'L' of the element (10) are the same. In other embodiments, the second non-integer lobe flights for the plurality of transformations along the lead 'L' of the element (10) are the same.

Figure 2A:
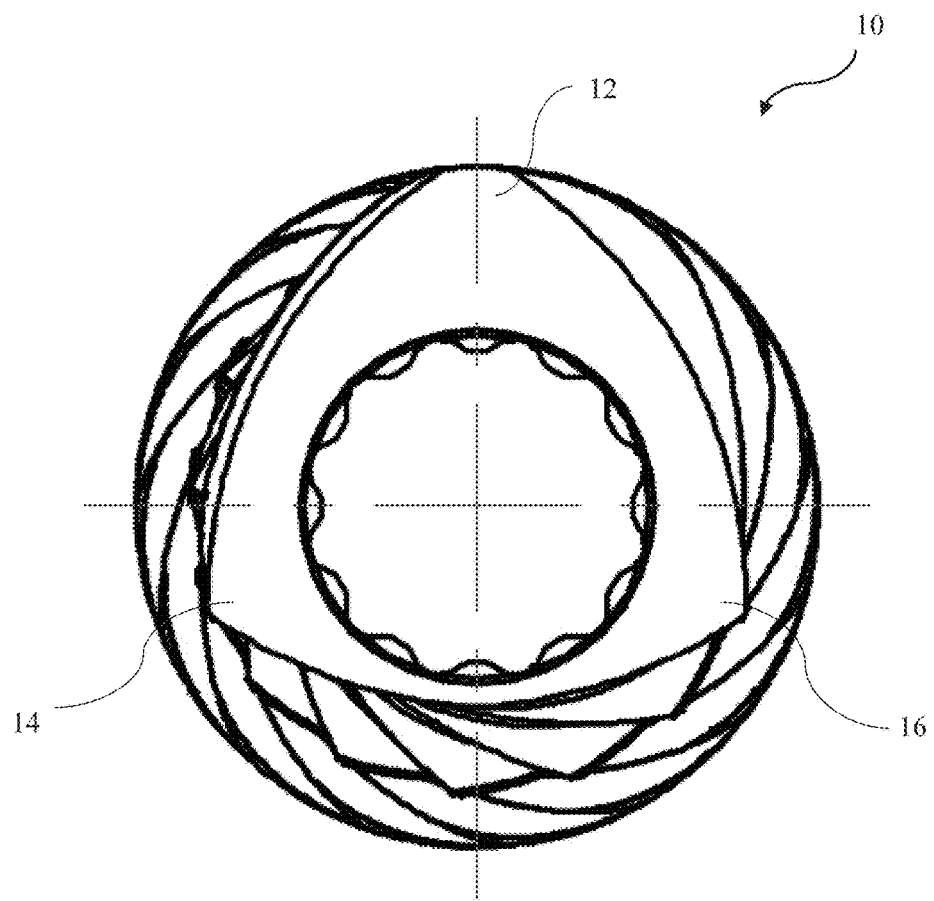
FIG. 2a illustrates a front view of the elements accordance with another embodiment of the present disclosure.
Figure 2B:
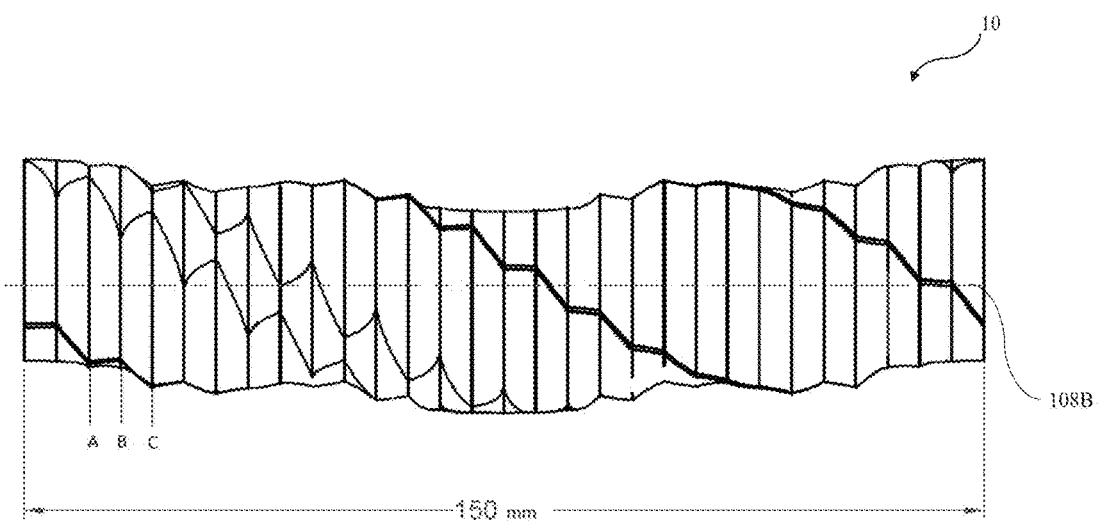
FIG. 2b illustrates a top view of the element in accordance with another embodiment of the present disclosure.

Referring now to FIG. 2a, a front view of an element (10) in accordance with another embodiment of the present disclosure is illustrated. FIG. 2b shows the top view of the element (10) of FIG. 2a. The element has a length of 150 mm and a lead 'L' also of 150 mm. At point A, the profile of the element is a first fractional lobe element, i.e. 1.3.80 in the example illustrated. At point B, the profile of the element is a second fractional lobe element, i.e. 1.3.20. At point C, the profile of the element is again the first fractional lobe element, i.e. 1.3.80. The element transforms from profile A to profile B to profile C. The transformation of the element from profile A to profile B, takes place within a fraction of the lead 'L', 5 mm in the embodiment disclosed. The element now transforms from profile B to profile C over the next 5 mm.

In the embodiment of FIG. 2b, the transformation from a first fractional lobe flight into second fractional lobe flight and back to first fractional lobe flight is repeated fifteen times along the length of the element (10) to obtain the 150 mm element.

The element (10) may have multiple continuous flights formed thereon. In an embodiment, each flight transforms at least once from a first non-integer lobe flight into a second non-integer lobe flight in a fraction of the lead 'L' and transforms back to the first non-integer lobe flight in a fraction of the lead 'L'. The first non-integer lobe flights for each flight may be the same. The second non-integer lobe flights for each flight may be the same. The element (10) of FIG. 1a has several continuous helical flights formed thereon (12, 14 16).

In other embodiments, the flight transforms at least once from a first non-integer lobe flight into a second non-integer lobe flight in a fraction of the lead 'L' and transforms from the second non-integer lobe flight to a third non-integer lobe flight in a fraction of the lead 'L'. By way of example, the flight transforms from a first fractional lobe flight to a second fractional lobe flight within a fraction of the lead 'L' and from the second fractional lobe flight to a third fractional lobe flight within a fraction of the lead L. The first non-integer lobe flight, the second non-integer lobe flight and the third non-integer lobe flight may be fractional lobe flights. In other embodiments, the first non-integer lobe flight, the second non-integer lobe flight and the third non-integer lobe flight may be irrational number lobe flights.

Specific Embodiments are Described Below

An element for a co-rotating twin screw processor, the element having a lead 'L' and at least one continuous flight helically formed thereon and, wherein the flight transforms at least once from a first non-integer lobe flight into a second non-integer lobe flight in a fraction of the lead 'L' and transforms back to the first non-integer lobe flight in a fraction of the lead 'L'.

Such element(s), wherein the first non-integer lobe flight is a fractional lobe flight.

Such element(s), wherein the second non-integer lobe flight is a fractional lobe flight.

Such element(s), wherein the first non-integer lobe flight is an irrational number lobe flight.

Such element(s), wherein the second non-integer lobe flight is an irrational number lobe flight.

Such element(s), having multiple continuous flights, each flight transforms at least once from a first non-integer lobe flight into a second non-integer lobe flight in a fraction of the lead 'L' and transforms back to the first non-integer lobe flight in a fraction of the lead 'L'.

Such element(s), wherein the first non-integer lobe flight for each flight is the same.

Such element(s), wherein the second non-integer lobe flight for each flight is the same.

Such element(s), wherein the flight transforms a plurality of times from a first non-integer lobe flight into a second non-integer lobe flight in a fraction of the lead 'L' and transforms back to the first non-integer lobe flight in a fraction of the lead 'L'.

Such element(s), wherein the first non-integer lobe flights for the plurality of transformations are the same.

Such element(s), wherein the second non-integer lobe flights for the plurality of transformations are the same.

Such element(s), wherein the length of the element is equal to the lead 'L'.

Further Specific Embodiments are Described Below

An element for a co-rotating twin screw processor, the element having a lead 'L' and at least one continuous flight helically formed thereon and, wherein the flight transforms at least once from a first non-integer lobe flight into a second non-integer lobe flight in a fraction of the lead 'L' and transforms from the second non-integer lobe flight to a third non-integer lobe flight in a fraction of the lead 'L'.

Such element(s), wherein the first non-integer lobe flight, second non-integer lobe flight and the third non-integer lobe flight are fractional lobe flights.

Such element(s), wherein the first non-integer lobe flight, second non-integer lobe flight and the third non-integer lobe flight are irrational number lobe flights.

Further Specific Embodiments are Described Below

A twin screw processor comprising a housing having at least two cylindrical housing bores, each housing bore having an axis disposed parallel to the other axis; at least a first screw shaft and a second screw shaft being disposed in the first and second housing bores; the first and second screw shaft being provided with elements defining a mixing zone; wherein at least one element has a lead 'L' and at least one continuous flight helically formed thereon and the flight transforms at least once from a first non-integer lobe flight into a second non-integer lobe flight in a fraction of the lead 'L' and transforms back to the first non-integer lobe flight in a fraction of the lead 'L'.

Further Specific Embodiments are Described Below

In any of the described embodiments or claims, the length of the element can be equal to the lead 'L.'

INDUSTRIAL APPLICABILITY

The element (10) as taught by the disclosure is an element suitable for use in co-rotating twin screw processors. The co-rotating twin screw processor may be a co-rotating twin screw extruder. The element is suitable for achieving a homogeneous melt mix and reducing material degradation by excessive shear. These elements prevent fatigue and thus prevent breakage in the elements or the shaft of the processor.

The disclosed element (10) creates turbulence in the melt flow without stagnation. The disclosed element (10) does not provide any right angled face to the flow of material.

The disclosed element (10) provides for improved reliability, reduced wear and increased uniformity of melting and mixing. The element is effective in creating uniform shear, hence intensifying the shear effect. This enhances the melting efficiency and also the overall efficiency of the extruder to a great extent. It also prevents degradation of the material during melting.

What is claimed is:

1. An element for a co-rotating twin screw processor, the element having a lead 'L' and at least one continuous flight helically formed thereon and, wherein the flight transforms at least once from a first non-integer lobe flight into a second non-integer lobe flight in a first fraction of the lead 'L' and transforms back to the first non-integer lobe flight in a second fraction of the lead 'L'.

2. An element as claimed in claim 1, wherein the first non-integer lobe flight is a fractional lobe flight.

3. An element as claimed in claim 2, wherein the second non-integer lobe flight is a fractional lobe flight.

4. An element as claimed in claim 1, wherein the second non-integer lobe flight is a fractional lobe flight.

5. An element as claimed in claim 1, wherein the first non-integer lobe flight is an irrational number lobe flight.

6. An element as claimed in claim 5, wherein the second non-integer lobe flight is an irrational number lobe flight.

7. An element as claimed in claim 1, wherein the second non-integer lobe flight is an irrational number lobe flight.

8. An element as claimed in claim 1, having multiple continuous flights, each flight transforms at least once from a first non-integer lobe flight into a second non-integer lobe flight in the first fraction of the lead 'L' and transforms back to the first non-integer lobe flight in the second fraction of the lead 'L'.

9. An element as claimed in claim 8, wherein the first non-integer lobe flight for each flight is the same.

10. An element as claimed claim 1, wherein the length of the element is equal to the lead 'L'.

11. An element as claimed in claim 8, wherein the second non-integer lobe flight for each flight is the same.

12. An element as claim 11, wherein the length of the element is equal to the lead 'L'.

13. An element as claimed in claim 1, wherein the flight transforms from the first non-integer lobe flight into the second non-integer lobe flight in the first fraction of the lead 'L' and transforms back to the first non-integer lobe flight in the second fraction of the lead 'L', wherein the transformation from the first non-integer lobe flight into the second non-integer lobe flight and back to the first non-integer lobe flight takes place a plurality of times along a length of the element.

14. An element as claimed in claim 13, wherein the first non-integer lobe flights for the plurality of transformations are the same.

15. An element as claimed in claim 13, wherein the second non-integer lobe flights for the plurality of transformations are the same.

16. An element as claimed in claim 13, wherein the length of the element is equal to the lead 'L'.

17. An element for a co-rotating twin screw processor, the element having a lead 'L' and at least one continuous flight helically formed thereon and, wherein the flight transforms at least once from a first non-integer lobe flight into a second non-integer lobe flight in a first fraction of the lead 'L' and transforms from the second non-integer lobe flight to a third non-integer lobe flight in a second fraction of the lead 'L'.

18. An element as claimed in claim 17, wherein the first non-integer lobe flight, second non-integer lobe flight and the third non-integer lobe flight are fractional lobe flights.

19. An element as claimed in claim 17, wherein the first non-integer lobe flight, second non-integer lobe flight and the third non-integer lobe flight are irrational number lobe flights.

20. A twin screw processor comprising:
 a housing having at least two cylindrical housing bores, each housing bore having an axis disposed parallel to the other axis;
 at least a first screw shaft and a second screw shaft being disposed in the first and second housing bores; the first and second screw shaft being provided with elements defining a mixing zone;

wherein at least one element has a lead 'L' and at least one continuous flight helically formed thereon and the flight transforms at least once from a first non-integer lobe flight into a second non-integer lobe flight in a first fraction of the lead 'L' and transforms back to the first non-integer lobe flight in a second fraction of the lead 'L'.

* * * * *